US012763098B2

(12) United States Patent
Le et al.

(10) Patent No.: US 12,763,098 B2
(45) Date of Patent: Oct. 13, 2026

(54) FINE ACTUATOR REACTION FORCE CANCELLATION FLEXIBLE SUSPENSION

(71) Applicant: Western Digital Technologies, Inc., San Jose, CA (US)

(72) Inventors: Toan Le, San Jose, CA (US); Kia Moh Teo, San Jose, CA (US); Haruhide Takahashi, Yokohama (JP); Yanning Liu, San Jose, CA (US); Toshihisa Okazaki, Bangkok (TH)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/885,487

(22) Filed: Sep. 13, 2024

(65) Prior Publication Data

US 2025/0266059 A1 Aug. 21, 2025

Related U.S. Application Data

(60) Provisional application No. 63/554,041, filed on Feb. 15, 2024.

(51) Int. Cl.
*G11B 5/48* (2006.01)

(52) U.S. Cl.
CPC ...... *G11B 5/484* (2013.01); *G11B 2220/2516* (2013.01)

(58) Field of Classification Search
None
See application file for complete search history.

(56) References Cited

U.S. PATENT DOCUMENTS 5,854,721 A * 12/1998 Lim ..................... G11B 5/4833 360/99.18
6,538,853 B1 * 3/2003 Williams ............. G11B 5/4813
(Continued)

FOREIGN PATENT DOCUMENTS

| | | | | |
|---|---|---|---|---|
| CN | 1467705 A | * | 1/2004 | ........... G11B 5/4826 |
| CN | 110085269 B | | 5/2022 | |
| JP | H10162519 A | | 6/1998 | |
| JP | 2000260140 A | * | 9/2000 | |

(Continued)

OTHER PUBLICATIONS

"Dummy suspension with piezo actuator," ip.com Prior Art Database Technical Disclosure, disclosed without attribution, IP.com No. IPCOM000234914D; Publication Date: Feb. 14, 2014 (Year: 2014).*
(Continued)

*Primary Examiner* — William J Klimowicz
(74) *Attorney, Agent, or Firm* — John D. Henkhaus

(57) ABSTRACT

A head stack assembly (HSA) for a hard disk drive includes a carriage from which multiple arms extend, where the arms include an outer arm at each end of the carriage and inner arms between the outer arms, such that each inner arm carries two suspension assemblies and each outer arm carries only one suspension assembly coupled with an inner side of the outer arm, with each suspension assembly including a corresponding fine actuator. The HSA further includes a counter-suspension assembly coupled to an outer side of each outer arm, where each counter-suspension assembly includes a structurally flexible dummy load beam having a mass distribution and a stiffness distribution configured to mitigate multiple structural dynamics modes of the operating suspension assembly coupled to the inner side of the outer arm.

20 Claims, 10 Drawing Sheets

(56) References Cited

U.S. PATENT DOCUMENTS

| | | | | |
|---|---|---|---|---|
| 6,661,615 | B2 | 12/2003 | Tsuda | |
| 7,016,157 | B1 * | 3/2006 | Williams | G11B 5/4833 360/265.7 |
| 7,433,159 | B2 | 10/2008 | Yao et al. | |
| 7,477,489 | B1 | 1/2009 | Chen et al. | |
| 7,508,634 | B2 | 3/2009 | Yao et al. | |
| 8,094,412 | B2 * | 1/2012 | Otake | G11B 5/6005 360/244.8 |
| 8,116,038 | B1 | 2/2012 | Zhang et al. | |
| 8,553,367 | B1 * | 10/2013 | Foisy | G11B 5/5569 360/265.7 |
| 8,780,504 | B1 | 7/2014 | Teo et al. | |
| 11,482,254 | B2 * | 10/2022 | Keshavan | G11B 5/5552 |
| 2002/0018321 | A1 * | 2/2002 | Utsunomiya | G11B 5/5521 360/265.7 |
| 2003/0179491 | A1 | 9/2003 | Yoo | |
| 2004/0095672 | A1 | 5/2004 | Price | |
| 2006/0232889 | A1 * | 10/2006 | Shum | G11B 5/486 360/245.9 |
| 2025/0069622 | A1 * | 2/2025 | Ee | G11B 5/4873 |

FOREIGN PATENT DOCUMENTS

| | | | | |
|---|---|---|---|---|
| JP | 3771076 B2 | * | 4/2006 | |
| KR | 20020042423 A | * | 6/2002 | G11B 5/5521 |

OTHER PUBLICATIONS

Horowitz, Roberto et al., Dual-stage servo systems and vibration compensation in computer hard disk drives, Control Engineering Practice 15 (2007) 291-305, Received Mar. 18, 2005; received in revised form Jul. 26, 2006; accepted Sep. 7, 2006, Elsevier Ltd.

Otake, Noritaka et al., Controlling Vibration of HDD Actuator by Using Dummy Heads, Journal of Advanced Mechanical Design, Systems, and Manufacturing, vol. 4 No. 1, pp. 82-87, Received Jul. 14, 2009, JSME.

* cited by examiner

FINE ACTUATOR REACTION FORCE CANCELLATION FLEXIBLE SUSPENSION

FIELD OF EMBODIMENTS

Embodiments of the invention may relate generally to a hard disk drive and particularly to a flexible suspension assembly for fine actuator reaction force cancellation.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

An HDD includes at least one head gimbal assembly (HGA) that generally includes a suspension assembly and a corresponding head slider mounted thereon and which houses the read/write transducer (or "head"). Each slider is attached to the free end of the suspension assembly that is cantilevered from the rigid arm of an actuator. Several actuator arms may be combined to form a single movable unit, a head stack assembly (HSA), typically having a rotary pivotal bearing system. The suspension assembly of a conventional HDD typically includes a relatively stiff load beam with a mount plate at its base end, which attaches to the actuator arm, and whose free end mounts a flexure (or "gimbal" or "gimbal flexure") that carries the slider and its read-write head. Positioned between the mount plate and the functional end of the load beam is effectively a "hinge" that is compliant in the vertical bending direction (normal to the disk surface). The hinge enables the load beam to suspend and load the slider and the read-write head toward the spinning disk surface. It is then the function of the flexure to provide gimbaled support for the slider so that the slider can pitch and roll (i.e., can gimbal) in order to adjust its orientation.

Increasing areal density (a measure of the quantity of information bits that can be stored on a given area of disk surface) has led to the necessary development and implementation of secondary and even tertiary actuators (generally, "fine actuators") for improved head positioning through relatively fine positioning, in addition to a primary voice coil motor (VCM) actuator which provides relatively coarse positioning. Some HDDs employ milli- or micro-actuator designs to provide second and/or third stage actuation of the recording head to enable more accurate positioning of the head relative to the recording tracks. Milli-actuators may be broadly classified as actuators that move the entire front end of the suspension: e.g., load beam, flexure and slider, and are typically used as second stage actuators. Micro-actuators (or "microactuators") may be broadly classified as actuators that move (e.g., rotate) only the slider, moving it relative to the suspension and load beam, or move only the read-write element relative to the slider body. A microactuator may be used solely in conjunction with a first stage actuator (e.g., VCM), or in conjunction with a first stage actuator and a second stage actuator (e.g., milli-actuator) for more accurate head positioning. Unless otherwise indicated, the terms "microactuator", "milli-actuator", "secondary actuator", "tertiary actuator", "dual stage actuator", "fine actuator" and the like, if used herein, refer generally to a relatively fine-positioning actuator (e.g., technically, either secondary or tertiary) used in conjunction with a primary relatively coarse-positioning actuator, such as a VCM actuator in the context of an HDD. Piezoelectric (PZT) based and capacitive micro-machined transducers are two types of fine-actuators that have been developed for use with HDD sliders.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to fine actuator reaction force cancellation for a suspension assembly of a head-gimbal assembly (HGA) for a hard disk drive (HDD) are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

Introduction

Terminology p References herein to "an embodiment", "one embodiment", and the like, are intended to mean that the particular feature, structure, or characteristic being described is included in at least one embodiment of the invention. However, instances of such phrases do not necessarily all refer to the same embodiment or to every embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the structure is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Figure 1:
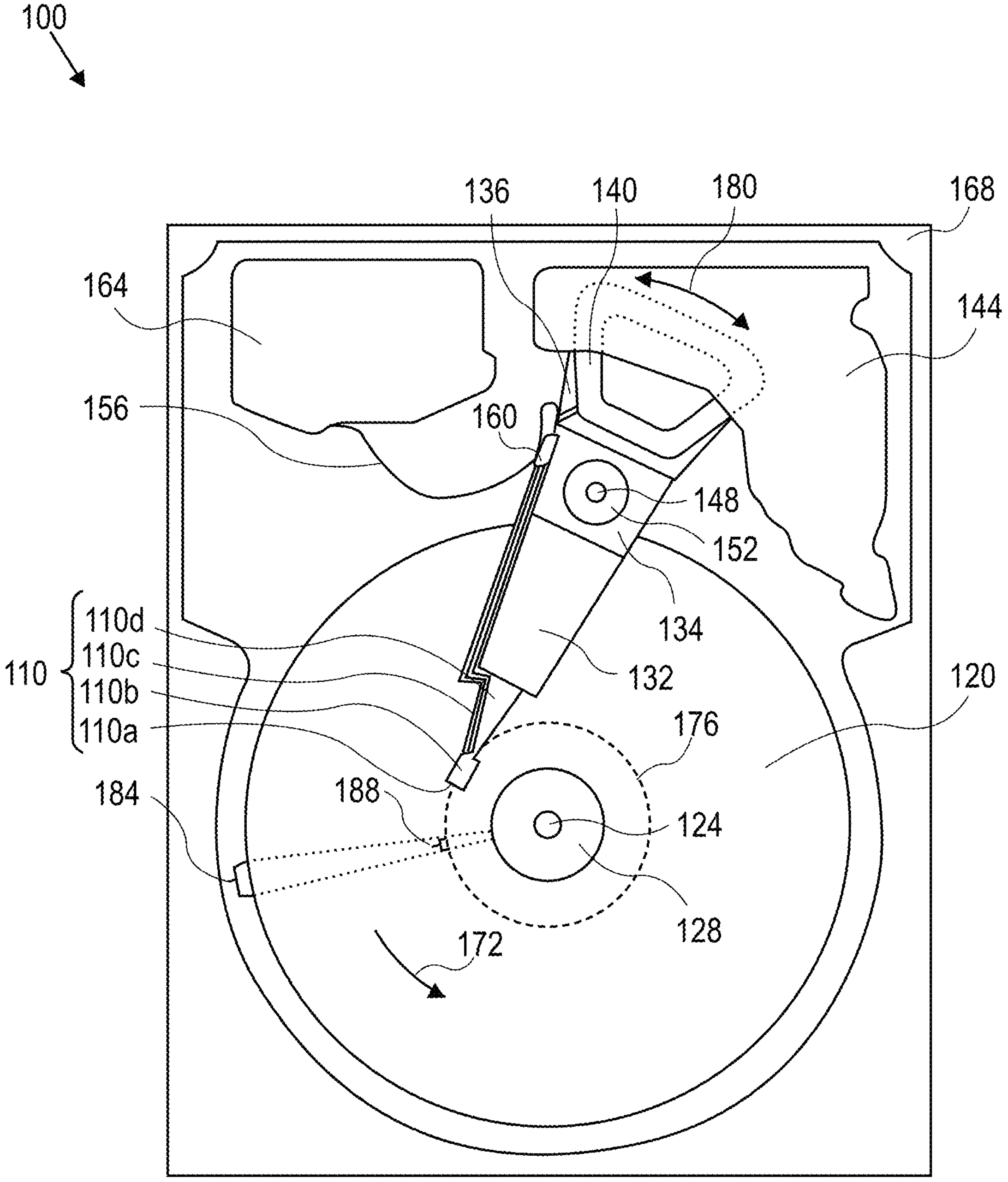
FIG. 1 is a plan view illustrating a hard disk drive, according to an embodiment.
Figure 2:
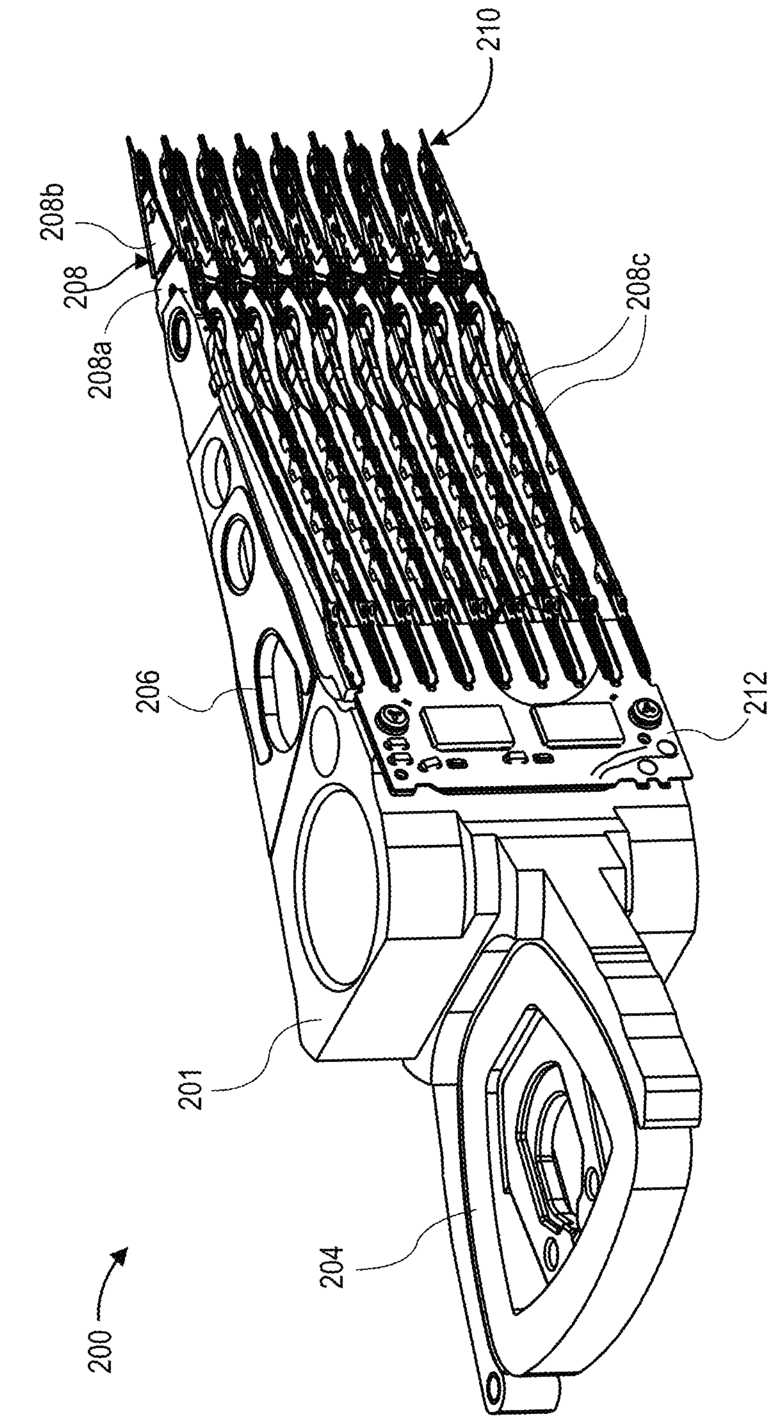
FIG. 2 is a perspective view illustrating an actuator assembly, according to an embodiment.

FIG. 2 is a perspective view illustrating an actuator assembly, according to an embodiment. Actuator assembly 200 comprises a carriage 201 (see, e.g., carriage 134 of FIG. 1) rotatably coupled with a central pivot shaft (not shown here; see, e.g., pivot shaft 148 of FIG. 1) by way of a pivot bearing assembly (not shown here; see, e.g., pivot bearing assembly 152 of FIG. 1), and rotationally driven by a voice coil motor (VCM), of which a voice coil 204 is illustrated here. Actuator assembly 200 further comprises multiple actuator arms 206 (see, e.g., arm 132 of FIG. 1), to each of which is coupled a suspension assembly 208 (see, e.g., lead suspension 110*c* of FIG. 1) housing a read-write head 210 (see, e.g., read-write head 110*a* of FIG. 1), and typically comprising a swaged baseplate 208*a*, a load beam 208*b* (see, e.g., load beam 110*d* of FIG. 1), and a suspension tail 208*c*. Each suspension assembly 208 is electrically connected with a flexible printed circuit (FPC) 212 coupled with the carriage 201, by way of suspension tail 208*c*.

Recall that fine actuators were developed and implemented for improved head positioning through relatively fine positioning, in addition to a primary voice coil motor (VCM) actuator which provides relatively coarse positioning. A hard disk drive (HDD) head stack assembly (HSA) typically contains multiple arms. The top and bottom arms of the HSA, also referred to as outer arms, carry only one suspension with a head to read/write (R/W) data on a media surface. By contrast, the inner arms of the HSA carry two suspensions on each arm, i.e., one suspension with an up-facing head to R/W on the bottom media surface of an above disk and the other suspension with a down-facing head to R/W data on the top media surface of an adjacent below disk. For suspensions integrated with PZT actuators, it is often beneficial to fine-drive the up and down facing suspensions in opposite directions (out-of-phase) so that the reaction forces induced on the common arm are cancelled. This leads to better performance with less resonance peaks in the fine actuator transfer function (TF). A TF, also referred to as a Frequency Response Function (FRF), is used to express the dynamic characteristics of a structure in frequency domain with peaks at its resonant frequencies and gains of those peaks related to the damping for those resonances and how external forces are applied. This cancellation is effective for inner arms carrying two suspensions as the reaction forces from the two suspension fine actuators are of the same amplitude but out of phase and, therefore, cancel each other. However, there is no opposing suspension to fine-drive for reaction force cancellation for the outer arms carrying only one suspension.

Due to the absence of reaction force cancellation on the outer arms, when the fine actuators on all suspensions are driven in parallel, the reaction forces from outer arms responsively create extra resonance peaks for inner heads. One solution is to use a demultiplexer ("demux") to fine-drive inner arm heads separately from outer arm heads, at least one approach to which is described in U.S. Pat. No. 11,482,254, the entire content of which is incorporated by reference for all purposes as if fully set forth herein. Such demux control circuitry decouples inner arm heads from outer arm heads to achieve significantly effective reaction force cancellation for the inner arm heads, resulting in a better TF. However, fine actuator TF of outer heads is still not as good as fine actuator TF of inner heads due to the absence of reaction force cancellation in that context.

Flexible Counter-Suspension Assembly

To address the foregoing challenges associated with the performance of the outer heads, as may manifest in the expression of a corresponding FRF, according to an embodiment a balancing (e.g., "counter") fine actuator on a counter-suspension (e.g., "dummy" suspension) assembly may be implemented on the outer arms to cancel the reaction force for the single "real" suspension on such arm. The balancing fine actuator is operated out-of-phase with the suspension fine actuator on the same arm, and the structural dynamics of the corresponding counter-suspension is "tuned", e.g., judiciously configured as a flexible structure/component, to match key suspension resonance frequencies and to achieve optimal reaction force cancellation similar to or approaching that of the inner arms with two suspensions.

Figure 3A:
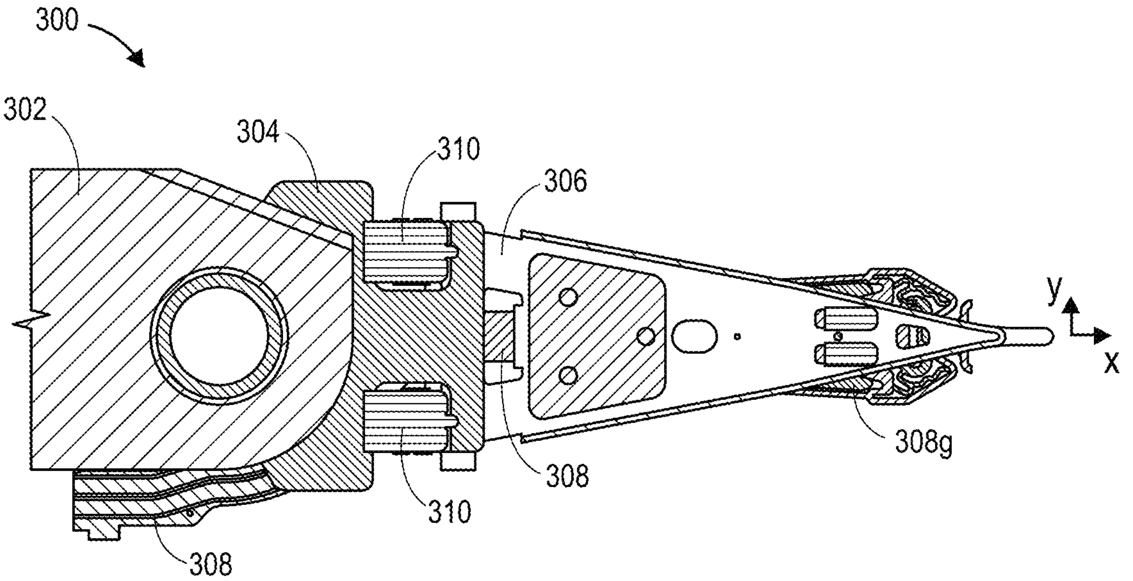
FIG. 3A is a plan view illustrating a hard disk drive suspension assembly coupled to an arm on the inner side, according to an embodiment.

FIG. 3A is a plan view illustrating a hard disk drive suspension assembly coupled to an arm on the inner side, according to an embodiment. As depicted, suspension assembly 300 is coupled to the inner surface (lower surface in this top view) of an arm 302. Suspension assembly 300 comprises a mount plate 304, which is typically swaged to the arm 302, to which is connected a load beam 306 which is coupled with a flexure 308 generally running the length of the suspension assembly 300 and ending at a distal gimballing portion 308*g* (or "gimbal" or "gimbal flexure") which carries a slider and its read-write head (not visible here; see, e.g., slider 110*b* and read-write head 110*a* of FIG. 1). Suspension assembly 300 further comprises a fine actuator 310, here referred to as a milliactuator as it is configured to move the load beam 306. Fine actuator 310 is generally positioned between and coupled with mount plate 304 and load beam 306. For purposes of this description, suspension assembly 300 is considered a "real" or working or operational suspension.

Figure 4A:
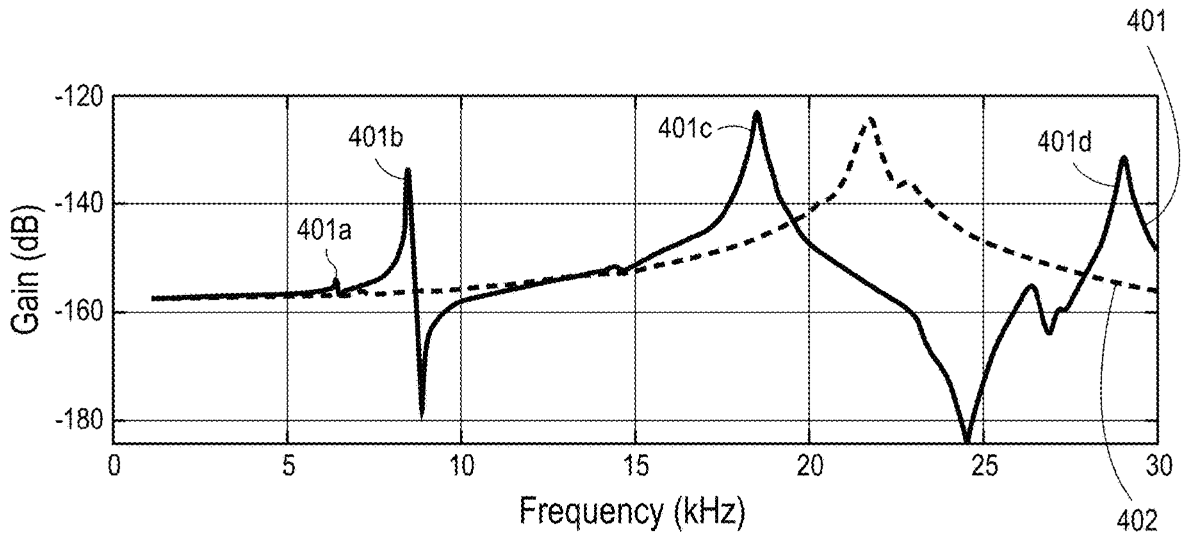
FIG. 4A is a graph illustrating example frequency response functions, including for a single conventional and mirrored suspension assemblies on shared arm, according to an embodiment.

FIG. 4A is a graph illustrating example frequency response functions, including for a single conventional and mirrored suspension assemblies on shared arm, according to an embodiment. In this example, the solid function (or signal) 401 represents the FRF of the read-write node on the suspension assembly 300 (with a head) mounted on an arm (see, e.g., arm 302 of FIG. 3A), e.g., characterizing the head off-track response to the voltage input of fine actuator 310, without any balancing or counter-suspension on the opposing side of the shared arm (see, e.g., FIG. 3A). As non-limiting examples for context for the approaches, techniques, embodiments described herein, depicted here by function 401 are a series of peaks: (a) a torsion mode 401*a* around about 6.4 kHz, (b) a whole arm (flat) sway mode 401*b* around about 8.5 kHz, (c) an end arm (twisting) sway mode 401*c* around about 18.5 kHz, and (d) a twisting sway mode 401*d* around about 29 kHz. These peaks are discussed in more detail hereafter with reference to a corresponding counter-suspension assembly. Here, the dashed function (or signal) 402 represents the FRF of the read-write node on the suspension assembly 300 with a mirrored suspension assembly (with a head) installed on the opposing side of the shared arm, responsive to the common voltage input to respective fine actuators such as fine actuator 310 on both suspensions on the shared arm.

Figure 3B:
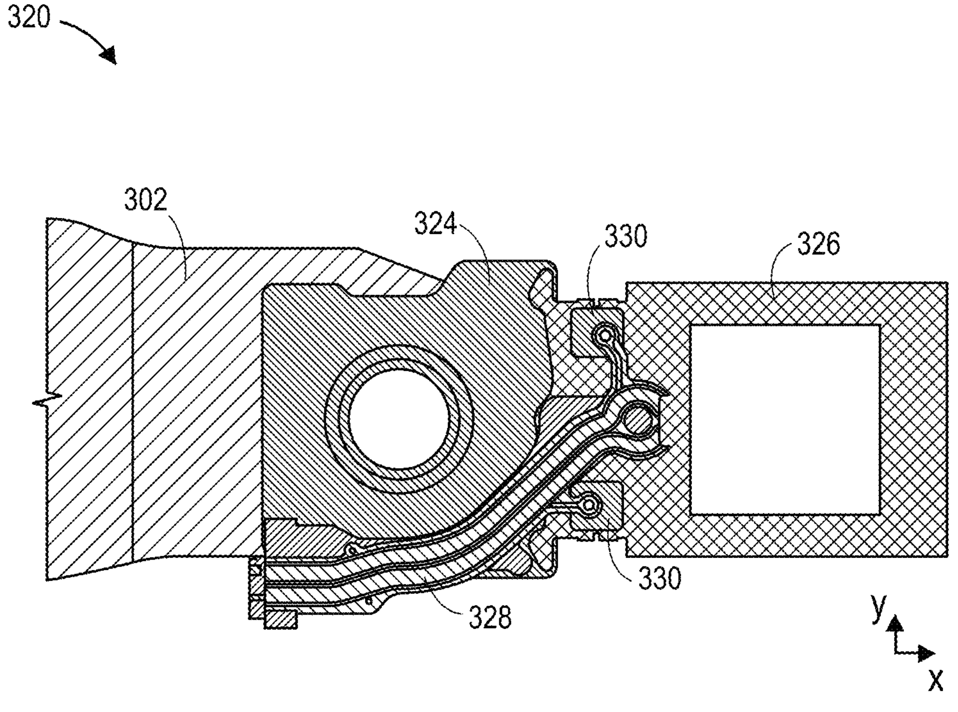
FIG. 3B is a plan view illustrating a hard disk drive counter-suspension assembly coupled to an arm on the outer side, according to an embodiment.

FIG. 3B is a plan view illustrating a hard disk drive counter-suspension assembly coupled to an arm on the outer side, according to an embodiment. As depicted, counter-suspension assembly 320 is coupled to the outer surface (upper surface in this top view) of an arm 302. Counter-suspension assembly 320 comprises a mount plate 324, which is typically swaged to the arm 302, to which is connected a load beam 326 which is coupled with a flexure 328. Here, flexure 328 only runs to the load beam 326 near fine actuator 330, and does not end at a distal gimballing portion as this counter-suspension 320 does not carry a slider or read-write head. As mentioned, counter-suspension assembly 320 further comprises a balancing fine actuator 330, here referred to as a milliactuator as it is configured to move the load beam 326. Balancing fine actuator 330 is generally positioned between and coupled with mount plate 324 and load beam 326. For purposes of this description, counter-suspension assembly 320 may be considered or referred to as a "dummy" suspension.

Figure 3C:
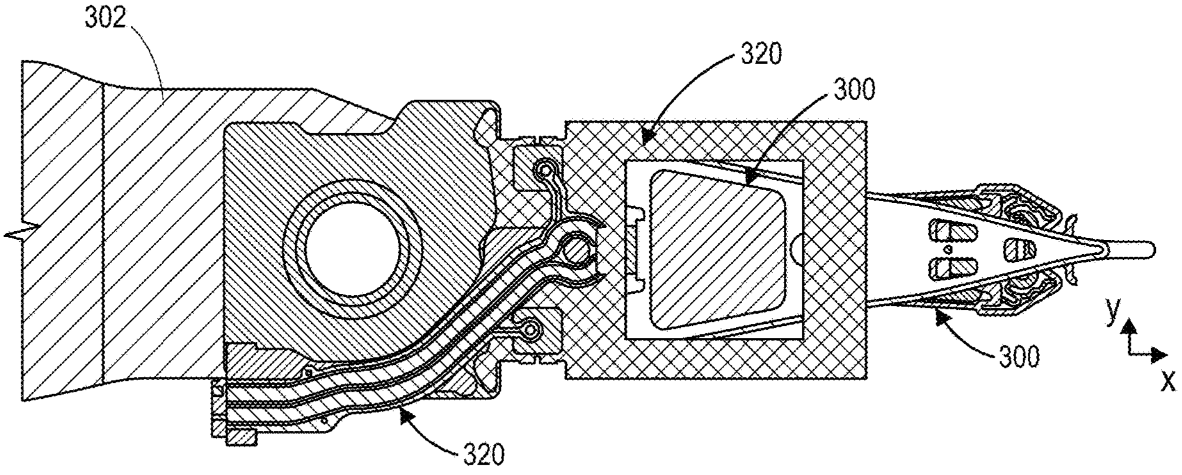
FIG. 3C is a plan view illustrating the suspension assembly of FIG. 3A and the counter-suspension assembly of FIG. 3B mounted on the shared arm, according to an embodiment.
Figure 4B:
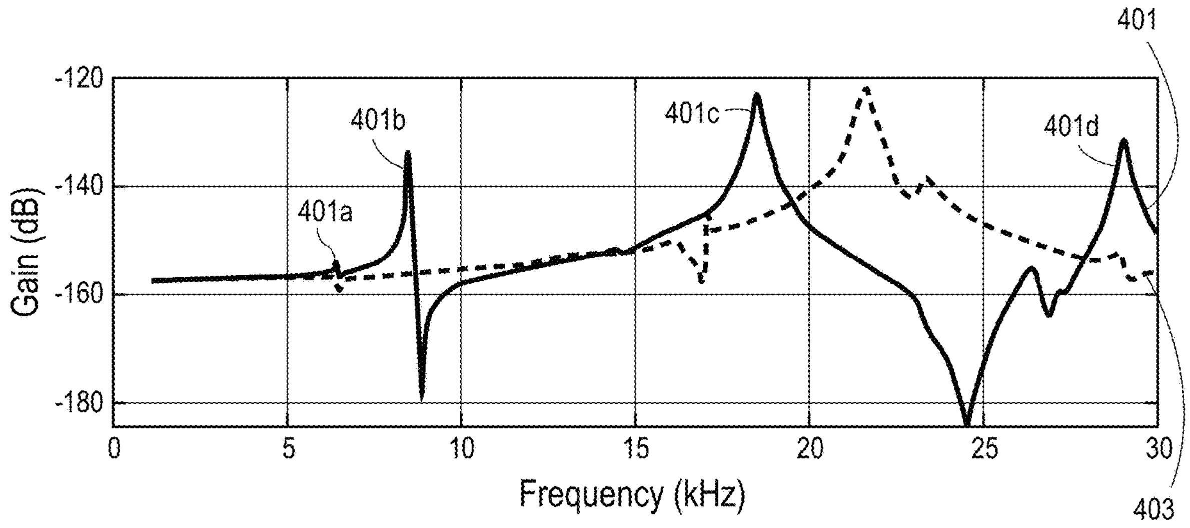
FIG. 4B is a graph illustrating example frequency response functions, including for a single conventional and with a counter-suspension assembly on shared arm, according to an embodiment.

FIG. 3C is a plan view illustrating the suspension assembly of FIG. 3A and the counter-suspension assembly of FIG. 3B mounted on a shared arm, according to an embodiment. Refer to the respective FIGS. 3A-3B for descriptions of the constituent components of suspension assembly 300 and counter-suspension assembly 320. FIG. 4B is a graph illustrating example frequency response functions, including for a single conventional and with a counter-suspension assembly on shared arm, according to an embodiment. In this example, the solid function (or signal) 401 again represents the FRF of the read-write node on the suspension assembly 300 mounted on an arm (see, e.g., arm 302 of FIG. 3A) and responsive to the voltage input of fine actuator 310. Here, the dashed function (or signal) 403 represents the FRF of the read-write node on the suspension assembly 300 with the counter-suspension assembly 320 mounted on the opposing side of the shared arm (e.g., arm 302 of FIG. 3C), and responsive to the common voltage of fine actuator 310 and balancing fine actuator 330 (FIG. 3B). The control voltage to fine actuator 310 of suspension assembly 300 on the outer arm 302 is also applied to the fine actuator 330 of the counter-suspension assembly 320 on the same arm 302. The fine actuator 330 of the counter-suspension assembly 320 is designed to move the counter-suspension assembly 320 in the opposite direction with respect to the fine actuator 310 of the suspension assembly 300 on the same arm 302 so that their reaction forces on the arm are in opposite directions. Therefore, such opposing reaction forces are effectively cancelled when the counter-suspension is designed to match a real suspension (e.g., with head) dynamics. It is noteworthy that multiple structural modes of (inner) suspension assembly 300 are effectively mitigated or cancelled with the use of a (outer) counter-suspension assembly 320, e.g., as depicted, the whole arm (flat) sway mode 401*b*, end arm (twisting) sway 401*c*, twisting sway 401*d*. Whereas signal 401 indicates three major peaks (e.g., 401*b*-401*d*) to 30 kHz, signal 403 indicates only the one major peak to 30 kHz, e.g., at around 22 kHz.

Comparing the example signal 403 (FIG. 4B) representing the FRF of the read-write node on the suspension assembly 300 with the counter-suspension assembly 320 on the opposing side of the shared arm, with the signal 402 (FIG. 4A) representing the FRF of the read-write node on the suspension assembly 300 with a mirrored suspension assembly on the opposing side of the shared arm, it is visually apparent that signal 403 relatively closely matches with signal 402. Albeit, counter-suspension assembly 320 may be further optimized to more closely match the two structural dynamics functions, as the graphs of FIGS. 4A-4B here simply serve non-limiting explanatory purposes. The point is that a counter-suspension (or "balancing" suspension) assembly such as counter-suspension assembly 320 can be judiciously configured as a flexible structure/component (i.e., "tuned"), in conjunction with a balancing fine actuator such as balancing fine actuator 330 operating out-of-phase with the suspension fine actuator 310 on the same arm 302, such that the structural dynamics of the counter-suspension assembly 320 substantially matches key resonance frequencies of the corresponding suspension assembly 300, to achieve optimal reaction force cancellation/mitigation of multiple modes similar to or approaching that of the inner arms with two suspensions. Furthermore, the cost to manufacture a counter-suspension assembly such as counter-suspension assembly 320 may be significantly less than a mirrored suspension assembly, at least in part due to the absence of a relatively costly read-write head and gimbal flexure.

Figure 4C:
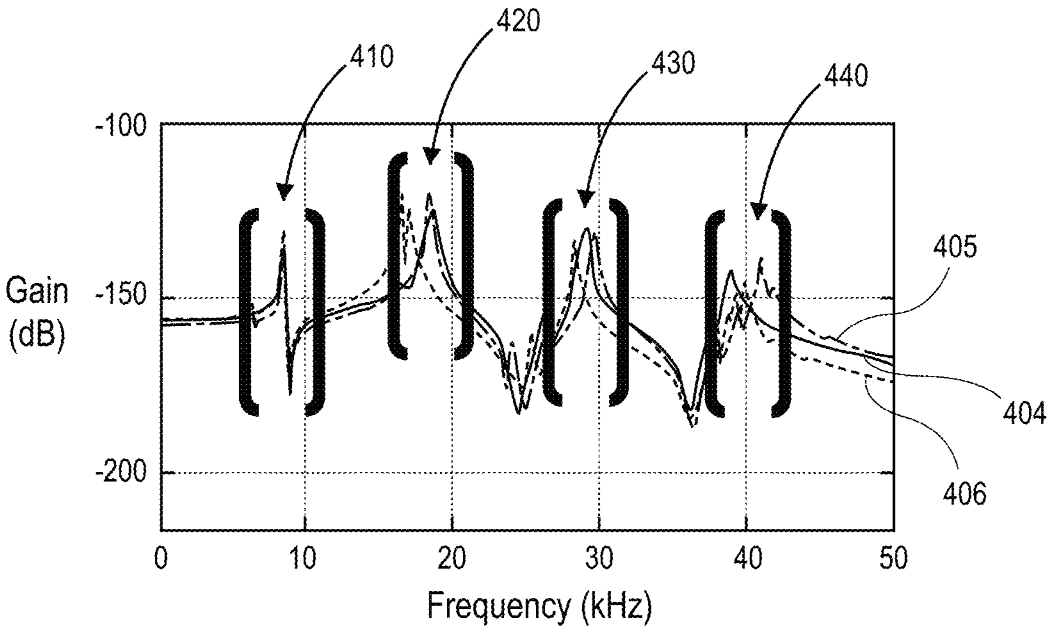
FIG. 4C is a graph illustrating example frequency response functions, including for single conventional and counter-suspension assemblies, according to an embodiment.

FIG. 4C is a graph illustrating example frequency response functions, including for single conventional and counter-suspension assemblies, according to an embodiment. Here the illustrated frequency range is expanded beyond 30 kHz to show a fourth peak 440 around 40 kHz. In this example, the solid function (or signal) 404 represents the FRF corresponding to a single conventional suspension assembly (with a head) mounted on an arm and responsive to the voltage input of a fine actuator (see, e.g., fine actuator 310 of FIG. 3A), the alternating dashed function (or signal) 405 represents the FRF corresponding to a single trapezoidal counter-suspension assembly (no head) mounted on an arm and responsive to the voltage input of a corresponding fine actuator (see, e.g., fine actuator 330 of FIG. 3B), and the fine dashed function (or signal) 406 represents the FRF corresponding to a single rectangular counter-suspension assembly (no head) mounted on an arm and responsive to the voltage input of a fine actuator such as fine actuator 330. FIG. 4C shows that there are four highlighted (i.e., bracketed) peaks 410, 420, 430, and 440 corresponding to the structural dynamics of each respective single suspension assembly, each occurring roughly around the same frequency as the other suspension assemblies.

Figure 4D:
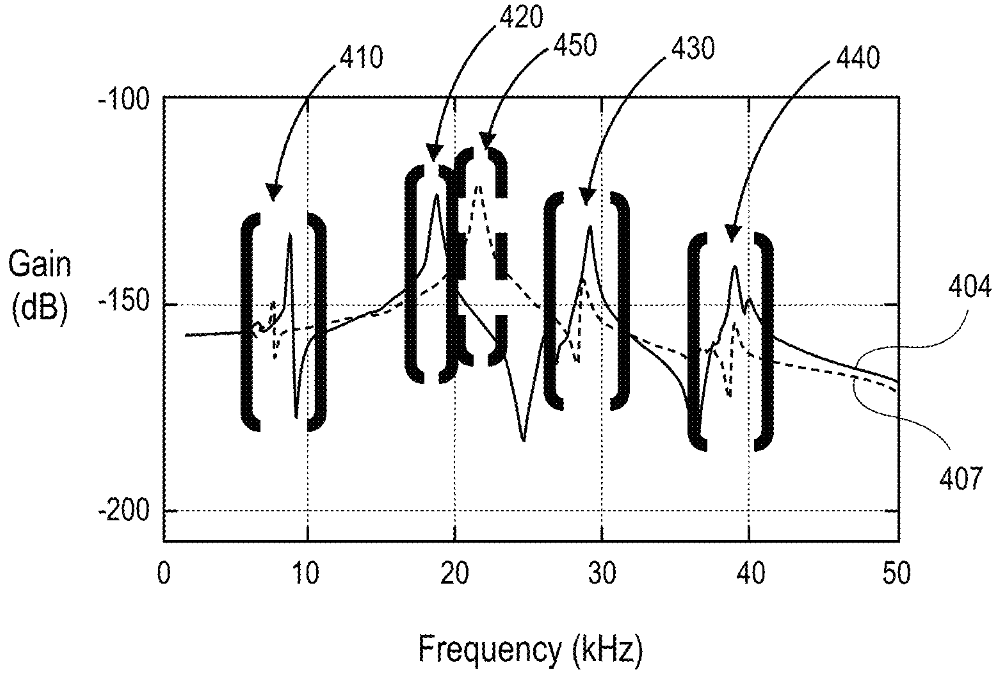
FIG. 4D is a graph illustrating example frequency response functions, including for a single conventional and with a counter-suspension assembly on shared arm, according to an embodiment.

FIG. 4D is a graph illustrating example frequency response functions, including for a single conventional and with a counter-suspension assembly on shared arm, according to an embodiment. Here too the illustrated frequency range is expanded beyond 30 kHz. In this example, the solid function (or signal) 404 again represents the FRF corresponding to a single conventional suspension assembly mounted on an arm and responsive to the voltage input of fine actuator 310, while the fine dashed function (or signal) 407 represents the FRF corresponding to a conventional suspension assembly and a rectangular counter-suspension assembly mounted on the shared arm and responsive to the voltage input of respective fine actuators (e.g., including a balancing fine counter-actuator such as fine actuator 330 of FIG. 3B). FIG. 4D illustrates that while there are the aforementioned four major peaks 410, 420, 430, and 440 to 40 kHz corresponding to the structural dynamics of a single conventional suspension assembly, the example signal 407 representing the FRF corresponding to conventional suspension assembly 300 with a counter-suspension assembly 320 on the opposing side of the shared arm 302 results in only one major peak 450.

Example Dummy Load Beam Structures

In practice, the precise structural configuration of a counter-suspension assembly (e.g., counter-suspension assembly 320 of FIG. 3B) may vary from implementation to implementation, based largely on the structural dynamics of the corresponding suspension assembly that is the target of such counter-balancing. Noteworthy structural attributes that may or should be considered, according to one or more embodiments, is the distribution of mass and/or the distribution of stiffness within a given "dummy" load beam (e.g., load beam 326 of FIG. 3B). As such, counter-suspension assembly 320 may be configured as a flexible structure rather than as a simple rigid body mass (which does not or only negligibly deforms under physics forces) designed as an equivalent mass to be driven by a dummy fine actuator as the mass of an opposing HGA being targeted. Consequently, counter-suspension assembly 320 may be designed to counter or mitigate multiple structural modes of the corresponding suspension assembly 300 (FIG. 3A) under the fine actuator 310 (FIG. 3A) forces, rather than only a single (e.g., low frequency) structural mode/peak. Thus, multiple dummy load beam structural configurations were modeled and analyzed, and are presented as follows as non-limiting example configurations that may be optimized for mode mitigation/cancellation by substantially matching key modes of a "real" operating suspension assembly.

Figure 5A:
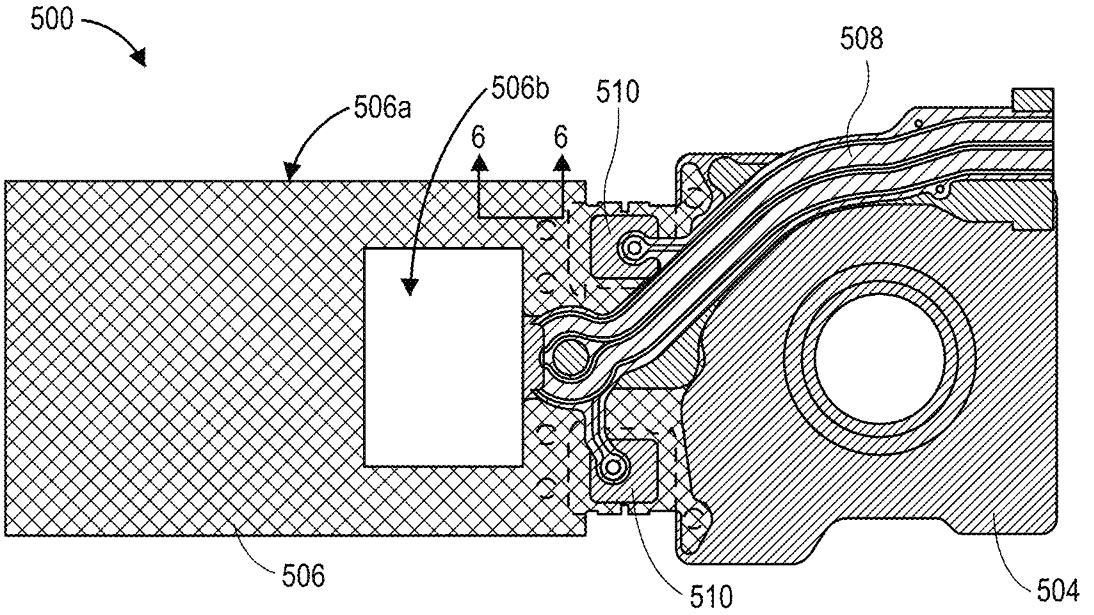
FIG. 5A is a plan view illustrating a first example counter-suspension assembly, according to an embodiment.

FIG. 5A is a plan view illustrating a first example counter-suspension assembly, according to an embodiment. Counter-suspension assembly 500 is coupled to the outer surface of an arm (not shown here; see, e.g., arm 302 of FIG. 3B). Counter-suspension assembly 500 comprises a mount plate 504, to which is connected a rectangular load beam 506 which is coupled with a flexure 508. Here also, flexure 508 only runs to the load beam 506 near a fine actuator 510 because counter-suspension assembly 500 does not carry a slider or read-write head. For purposes of this description, counter-suspension assembly 500 may be considered or referred to as a "dummy" suspension including a "dummy" load beam 506. With a rectangular structural main body **506*a* like that of counter-suspension assembly 500, further comprising a rectangular cut-out 506*b* from the main body 506*a*, optimization techniques considered include but are not limited to various adjustments to the length of the main body 506*a* in the longitudinal direction (x-direction, along the long axis of main body 506*a*) as well as various adjustments to the length of the cut-out 506*b* in the longitudinal direction. Likewise, various adjustments to the width of the main body 506*a* in the lateral direction (y-direction, along the short axis of the main body 506*a*) and/or the cut-out 506*b* may also be applied in optimizing a counter-suspension assembly such as counter-suspension assembly 500** to match key modes of a corresponding operating suspension assembly for mode cancellation/mitigation purposes.

Figure 5B:
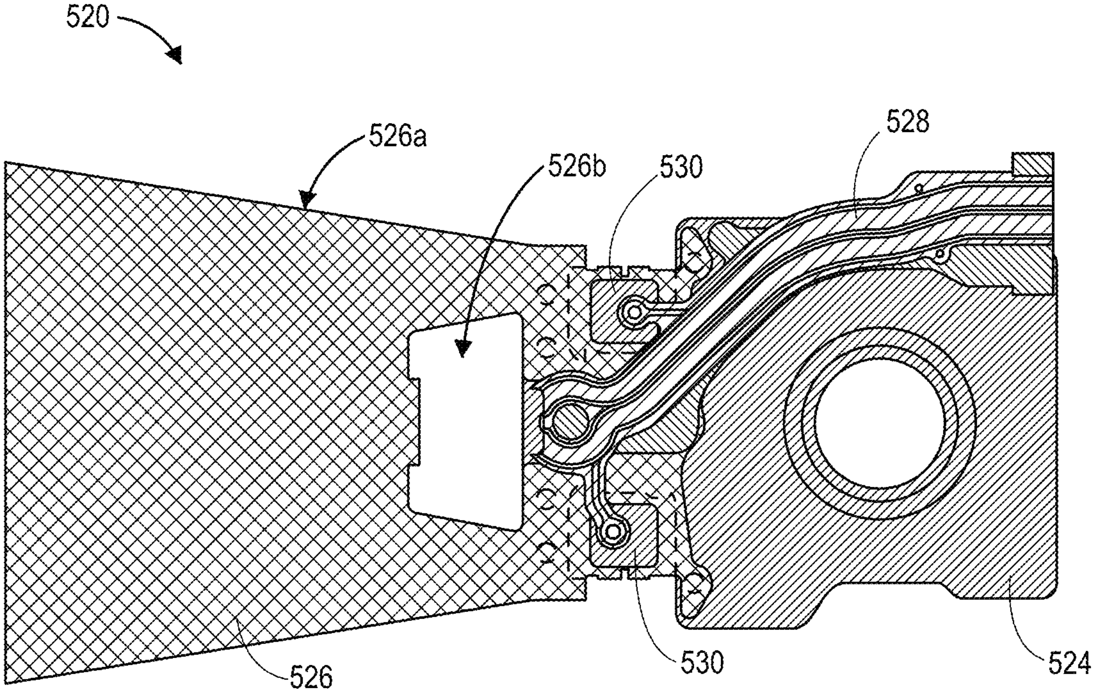
FIG. 5B is a plan view illustrating a second example counter-suspension assembly, according to an embodiment.

FIG. 5B is a plan view illustrating a second example counter-suspension assembly, according to an embodiment. Counter-suspension assembly 520 is coupled to the outer surface of an arm (not shown here; see, e.g., arm 302 of FIG. 3B). Counter-suspension assembly 520 comprises a mount plate 524, to which is connected a trapezoidal load beam 526 which is coupled with a flexure 528. Here also, flexure 528 only runs to the load beam 526 near a fine actuator 530 because counter-suspension assembly 520 does not carry a slider or read-write head. For purposes of this description, counter-suspension assembly 520 may be considered or referred to as a "dummy" suspension including a "dummy" load beam 526. With a trapezoidal structural main body **526*a* like that of counter-suspension assembly 520, further comprising a largely trapezoidal cut-out 526*b* from the main body 526*a*, optimization techniques considered include but are not limited to various adjustments to the length of the main body 526*a* in the longitudinal direction (x-direction, along the long axis of main body 526*a*) as well as various adjustments to the length of the cut-out 526*b* in the longitudinal direction. Likewise, various adjustments to the width of the main body 526*a* in the lateral direction (y-direction, along the short axis of main body 526*a*), the relationship between the bases and legs of main body 526*a*, the width of the cut-out 526*b*, and/or the relationship between the bases and legs of the cut-out 526*b* may also be applied in optimizing a counter-suspension assembly such as counter-suspension assembly 520** to match key modes of a corresponding operating suspension assembly for mode cancellation/mitigation purposes.

Figure 5C:
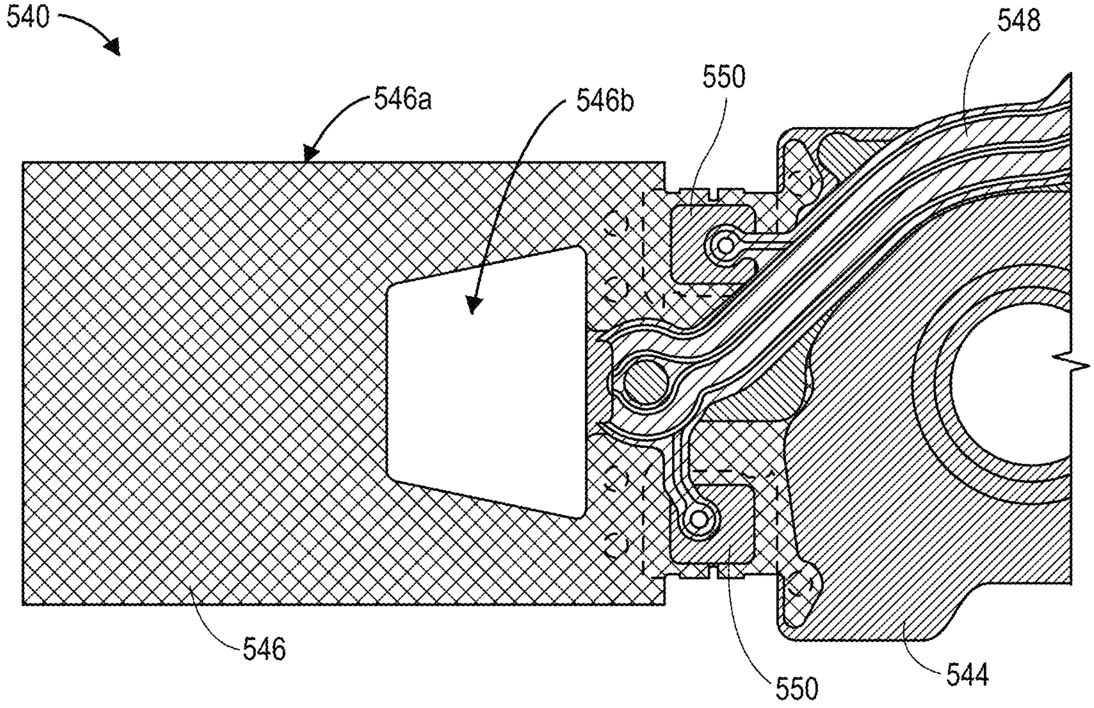
FIG. 5C is a plan view illustrating a third example counter-suspension assembly, according to an embodiment.

FIG. 5C is a plan view illustrating a third example counter-suspension assembly, according to an embodiment. Counter-suspension assembly 540 is coupled to the outer surface of an arm (not shown here; see, e.g., arm 302 of FIG. 3B). Counter-suspension assembly 540 comprises a mount plate 544, to which is connected a rectangular load beam 546 which is coupled with a flexure 548. Here also, flexure 548 only runs to the load beam 546 near a fine actuator 550 because counter-suspension assembly 540 does not carry a slider or read-write head. For purposes of this description, counter-suspension assembly 540 may be considered or referred to as a "dummy" suspension including a "dummy" load beam 546. With a rectangular structural main body 546*a* like that of counter-suspension assembly 540, further comprising a trapezoidal cut-out 546*b* from the main body 546*a*, optimization techniques considered include but are not limited to various adjustments to the length of the main body 546*a* in the longitudinal direction (x-direction, along the long axis of main body 546*a*) as well as various adjustments to the length of the cut-out 546*b* in the longitudinal direction. Likewise, various adjustments to the width of the main body 546*a* in the lateral direction (y-direction, along the short axis of main body 546*a*), and/or the relationship between the bases and legs of the cut-out 546*b* may also be applied in optimizing a counter-suspension assembly such as counter-suspension assembly 540 to match key modes of a corresponding operating suspension assembly for mode cancellation/mitigation purposes.

Figure 5D:
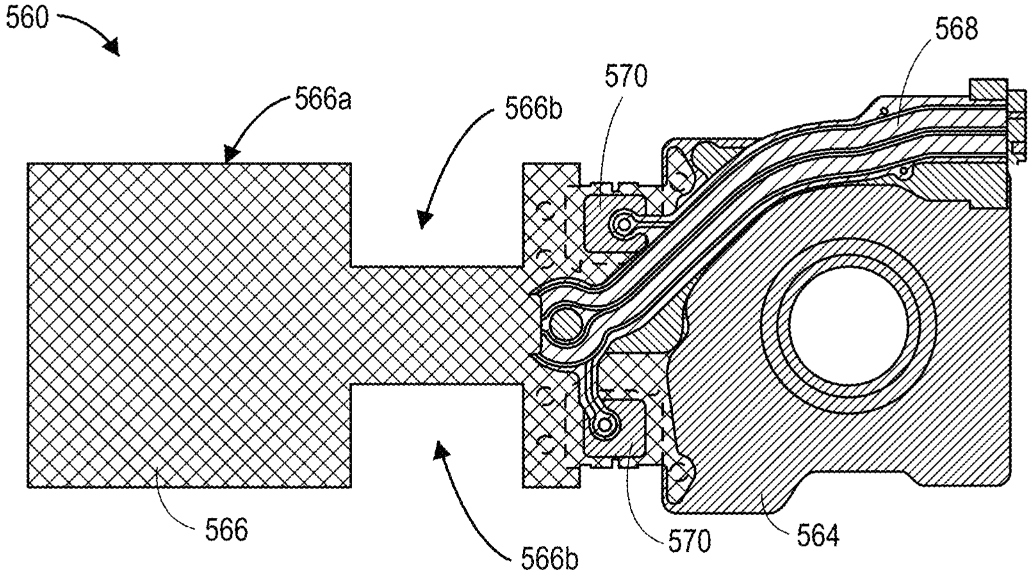
FIG. 5D is a plan view illustrating a fourth example counter-suspension assembly, according to an embodiment.

FIG. 5D is a plan view illustrating a fourth example counter-suspension assembly, according to an embodiment. Counter-suspension assembly 560 is coupled to the outer surface of an arm (not shown here; see, e.g., arm 302 of FIG. 3B). Counter-suspension assembly 560 comprises a mount plate 564, to which is connected a rectangular load beam 566 which is coupled with a flexure 568. Here also, flexure 568 only runs to the load beam 566 near a fine actuator 570 because counter-suspension assembly 560 does not carry a slider or read-write head. For purposes of this description, counter-suspension assembly 560 may be considered or referred to as a "dummy" suspension including a "dummy" load beam 566. With a rectangular structural main body 556*a* like that of counter-suspension assembly 560, further comprising a cut-away 566*b* from at least one lateral side of the main body 566*a*, optimization techniques considered include but are not limited to various adjustments to the length of the main body 566*a* in the longitudinal direction (x-direction, along the long axis of main body 566*a*) as well as various adjustments to the length of the cut-away(s) 566*b* in the longitudinal direction. Likewise, various adjustments to the width of the main body 566*a* in the lateral direction (y-direction, along the short axis of main body 566*a*) and/or the cut-away(s) 566*b* may also be applied in optimizing a counter-suspension assembly such as counter-suspension assembly 560 to match key modes of a corresponding operating suspension assembly for mode cancellation/mitigation purposes.

Figure 6:
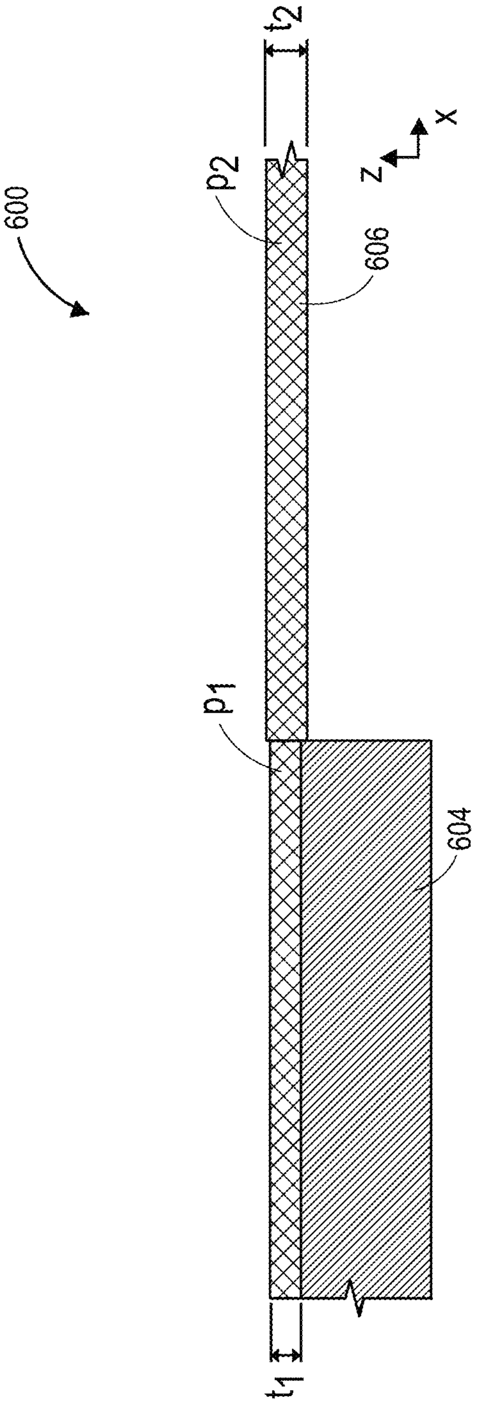
FIG. 6 is a cross-sectional side view illustrating an example counter-suspension assembly having non-uniform thickness, according to an embodiment.

FIG. 6 is a cross-sectional side view illustrating an example counter-suspension assembly having non-uniform thickness, according to an embodiment. Reference is made to FIG. 5A for location of cross-section 6-6. Counter-suspension assembly 600 is coupled to the outer surface of an arm (not shown here). Counter-suspension assembly 600 comprises a mount plate 604, which is typically swaged to the arm, to which is connected a load beam 606. Counter-suspension assembly 600 further comprises a fine actuator (not visible here), here referred to as a milliactuator as it is configured to move the load beam 606. For purposes of this description, counter-suspension assembly 600 may be considered or referred to as a "dummy" suspension. According to at least the embodiment illustrated here, counter-suspension assembly 600 comprises the load beam 606 comprising a non-uniform thickness. According to a related embodiment, counter-suspension assembly 600 comprises the load beam 606 which comprises a first thickness $t_1$ at a first portion $p_1$ structurally interfacing with the mount plate 604 and a different second thickness $t_2$ at a second portion $p_2$ extending away from the mount plate 604. This embodiment illustrates that in addition to varying the configuration of structural features (e.g., main body, cut-out, cut-away) and shapes (e.g., rectangular, trapezoidal) in the x-direction (longitudinal) and y-direction (lateral) as described in reference to FIGS. 5A-5D, the thickness of the load beam 606 may additionally and alternatively be varied in the height (z-direction) for optimizing a counter-suspension assembly such as counter-suspension assembly 600 to match key modes of a corresponding operating suspension assembly for mode cancellation/mitigation purposes. For purposes of example, the first thickness $t_1$ at the first portion $p_1$ of load beam 606 structurally interfacing with the mount plate 604 is thinner than the second thickness $t_2$ at the second portion $p_2$ of the load beam 606 extending away from the mount plate 604. However, the location at which the load beam 606 may transition from one thickness to another, as well as the number of different thicknesses and thickness transitions, may vary from implementation to implementation, based largely on the structural dynamics of the corresponding suspension assembly that is the target of the multiple mode counter-balancing. In FIG. 6, the second portion $p_2$ of the load beam 606 is thickened compared to first portion $p_1$ from both top and bottom surfaces (e.g., in both up and down directions). Alternatively, the second portion $p_2$ of the load beam 606 may be thickened only in from the top or the bottom surface relative to $p_1$ (e.g., in either the up or down direction), such as for ease of manufacturing.

Method of Manufacturing a Head Gimbal Assembly

Figure 7:
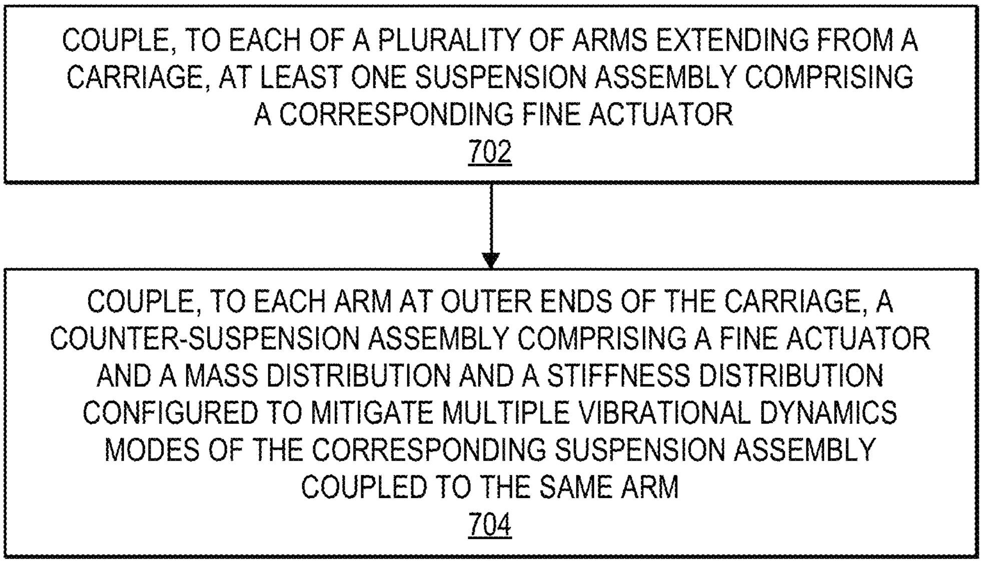
FIG. 7 is a flow diagram illustrating a method of manufacturing a head stack assembly (HSA), according to an embodiment.

FIG. 7 is a flow diagram illustrating a method of manufacturing a head stack assembly (HSA), according to an embodiment. A head stack assembly (HSA) assembled, manufactured, produced according to the method of FIG. 7 is designed, configured, intended for implementation into a hard disk drive (HDD) (see, e.g., HDD 100 of FIG. 1).

At block 702, couple, to each of a plurality of arms extending from a carriage, at least one suspension assembly comprising a corresponding fine actuator. For example, a suspension assembly such as suspension assembly 300 (FIGS. 3A, 3C) comprising a corresponding fine actuator 310 is coupled to each of a plurality of arms 302 (FIGS. 3A, 3C) extending from a carriage (see, e.g., carriage 201 of FIG. 2).

At block 704, couple, to each arm at outer ends of the carriage, a counter-suspension assembly comprising a fine actuator and a mass distribution and a stiffness distribution configured to mitigate multiple structural dynamics modes of the corresponding suspension assembly coupled to the same arm. For example, a counter-suspension assembly such as counter-suspension assembly 320 (FIGS. 3B-3C), 500 (FIG. 5A), 520 (FIG. 5B), 540 (FIG. 5C), 560 (FIG. 5D), comprising a corresponding fine actuator 330 (FIG. 3B), 510 (FIG. 5A), 530 (FIG. 5B), 550 (FIG. 5C), 570 (FIG. 5D), is coupled to each of a plurality of arms 302 (FIGS. 3A-3C).

In view of the embodiments described herein, a counter-suspension (or "balancing" suspension) assembly can be judiciously configured as a flexible structure/component (i.e., "tuned"), in conjunction with a balancing fine actuator operating out-of-phase with the corresponding "real" suspension fine actuator on the same arm, such that the structural dynamics of the counter-suspension assembly substantially matches multiple key resonance frequencies of the corresponding suspension assembly to achieve optimal reaction force cancellation/mitigation of multiple structural dynamics modes. The cost to manufacture a counter-suspension assembly may be significantly less than a mirrored suspension assembly, at least in part due to the absence of a relatively costly read-write head and gimbal flexure.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable", or "flexible printed circuit" (FPC)). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller (HDC), an interface controller, an arm electronics module, a data channel, a motor driver, a servo processor, buffer memory, etc. Two or more of such components may be combined on a single integrated circuit board referred to as a "system on a chip" (SOC). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) comprising:

a disk stack comprising a plurality of disk media rotatably mounted on a spindle;

a plurality of head sliders each housing a read-write transducer configured to read from and to write to a disk medium of the plurality of disk media;

a first-stage actuator configured for moving the plurality of head sliders to access portions of the plurality of disk media; and a head stack assembly (HSA) coupled with the actuator, the HSA comprising:

a carriage coupled with the actuator, a plurality of arms coupled to the carriage, the plurality of arms including an outer arm at each end of the disk stack and one or more inner arms between the outer arms, wherein each inner arm carries two suspension assemblies and each outer arm carries one suspension assembly, each suspension assembly comprising a corresponding fine actuator configured for moving a corresponding head slider of the plurality of head sliders to access portions of the corresponding disk medium, and a counter-suspension assembly coupled to a side of at least one outer arm opposing the corresponding suspension assembly, the counter-suspension assembly having a distribution of mass and a distribution of stiffness configured to counter multiple structural dynamics modes of the corresponding suspension assembly, wherein the distribution of mass within the counter-suspension assembly includes an interior cut-out from a main body of a counter-load beam of the counter-suspension assembly.

2. The HDD of claim 1, wherein the counter-suspension assembly comprises a fine actuator configured for moving a corresponding counter-load beam having the distribution of mass and the distribution of stiffness configured to counter the multiple structural dynamics modes of the corresponding suspension assembly including modes above 10 kiloHertz (kHz).

3. The HDD of claim 2, wherein the counter-load beam comprises the interior cut-out from the main body of the counter-load beam.

4. The HDD of claim 2, wherein the counter-load beam is configured as a flexible structure.

5. The HDD of claim 4, wherein the counter-load beam comprises the interior cut-out from the main body of the counter-load beam.

6. The HDD of claim 2, wherein a control voltage of the fine actuator of each counter-suspension assembly is configured to drive the counter-load beam in an opposing direction from the corresponding suspension assembly.

7. The HDD of claim 1, wherein the counter-suspension assembly comprises the counter-load beam having a rectangular main body and the interior cut-out through the main body.

8. The HDD of claim 1, wherein the counter-suspension assembly comprises the counter-load beam having a trapezoidal main body and the interior cut-out through the main body.

9. The HDD of claim 1, wherein the counter-suspension assembly comprises the counter-load beam having a non-uniform thickness.

10. The HDD of claim 9, wherein:

the counter-suspension assembly further comprises a base plate coupled with the at least one outer arm and to which the counter-load beam is coupled, and the counter-load beam comprises a first thickness at a first portion structurally interfacing with the base plate and a different second thickness at a second portion extending away from the base plate.

11. A hard disk drive (HDD) head stack assembly (HSA) comprising:

means for carrying a plurality of arms;

a plurality of arms coupled to the means for carrying, the plurality of arms including an outer arm at each end of the means for carrying and one or more inner arms between the outer arms, wherein each inner arm carries two suspension assemblies and each outer arm carries one suspension assembly coupled with an inner side of the outer arm, each suspension assembly comprising a corresponding fine actuator; and a counter-suspension assembly coupled to an outer side of each outer arm, each counter-suspension assembly having distribution of mass and a distribution of stiffness configured to mitigate multiple structural dynamics modes of the suspension assembly coupled to the inner side of the outer arm, wherein the distribution of mass within the counter-suspension assembly includes an interior cut-out from a main body of a counter-load beam of the counter-suspension assembly.

12. The HSA of claim 11, wherein the counter-suspension assembly comprises a fine actuator configured for moving a corresponding counter-load beam having the distribution of mass and the distribution of stiffness configured to mitigate the multiple structural dynamics modes of the suspension assembly coupled to the inner side of the outer arm including modes above 10 kiloHertz (kHz).

13. The HSA of claim 12, wherein the counter-load beam is a flexible structure.

14. The HSA of claim 12, wherein a control voltage of the fine actuator of each counter-suspension assembly is configured to drive the corresponding counter-load beam in an opposing direction from the corresponding suspension assembly.

15. The HSA of claim 11, wherein the counter-suspension assembly comprises the counter-load beam having a rectangular main body and the interior cut-out through the main body.

16. The HSA of claim 11, wherein the counter-suspension assembly comprises the counter-load beam having a trapezoidal main body and the interior cut-out through the main body.

17. The HSA of claim 11, wherein the counter-suspension assembly comprises the counter-load beam having a rectangular main body and a cut-away from each lateral side of the main body.

18. The HSA of claim 11, wherein the counter-suspension assembly comprises the counter-load beam having a non-uniform thickness.

19. A hard disk drive comprising the HSA of claim 11.

20. A method of manufacturing a head stack assembly (HSA), the method comprising:

coupling, to each of a plurality of arms extending from a carriage, at least one suspension assembly comprising a corresponding fine actuator; and coupling, to each arm at outer ends of the carriage, a counter-suspension assembly comprising a fine actuator and a mass distribution and a stiffness distribution configured to mitigate multiple structural dynamics modes of the corresponding suspension assembly coupled to the same arm, wherein the mass distribution within the counter-suspension assembly includes (i) an interior cut-out from a main body of a counter-load beam of the counter-suspension assembly and/or (ii) a cut-away from at least one lateral side of the main body and bounded at each end by the at least one lateral side.

* * * * *